UNITED STATES PATENT OFFICE.

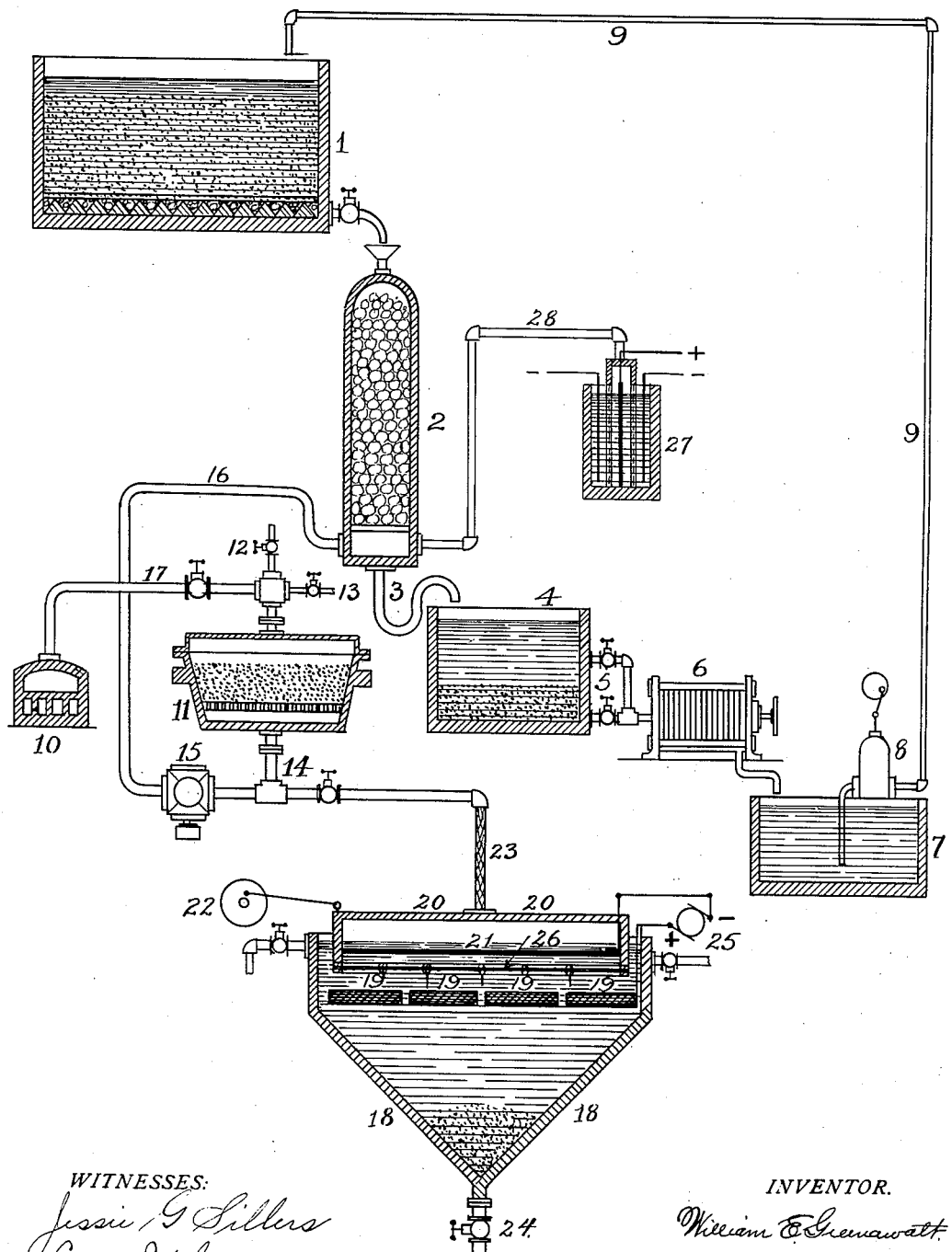

WILLIAM E. GREENAWALT, OF DENVER, COLORADO.

PROCESS OF EXTRACTING METALS FROM THEIR ORES.

1,186,306.  Specification of Letters Patent.  Patented June 6, 1916.

Application filed May 7, 1912. Serial No. 695,671.

*To all whom it may concern:*

Be it known that I, WILLIAM E. GREENAWALT, a citizen of the United States, residing in Denver, in the county of Denver and State of Colorado, have invented certain new and useful Improvements in Processes of Extracting Metals from Their Ores, of which the following is a specification.

It has for its object the attainment of a practicable method of applying electrolysis to the hydrometallurgical processes by overcoming entirely the difficulties due to fouling of the electrolyte. To accomplish this the electrolyte is kept separate and distinct from the leaching solution, or lixiviant.

In the electrolytic methods of extracting copper from its ores one of the greatest difficulties has been the fouling of the electrolyte. Every cycle, in the treatment of ores by a regenerative process, adds proportionately more salts to the solution and in consequence, if electrolyzed, increases the difficulty of electrolysis. Iron, especially, is likely to accumulate in the lixiviant, and during electrolysis, unless the utmost care is taken, will seriously impede the efficiency of deposition by useless oxidation at the anode and reduction at the cathode.

I have found a simple way out of the difficulty of impurities in the electrolyte, by an indirect method, which permits of foul leaching solutions to be used indefinitely, while the copper is electrolytically deposited from a pure electrolyte.

In my improved process the copper is dissolved, preferably, either as the chlorid or sulfate. It is then, preferably, precipitated with hydrogen sulfid, while an equivalent of acid is regenerated. The acid solution is then filtered from the sulfid precipitate and returned to the ore, and this cycle is repeated as often as necessary to get the desired extraction. The precipitate is electrolyzed, preferably to recover the copper and sulfur, so that the sulfur may be again converted into hydrogen sulfid to again pass through another cycle.

If dilute hydrochloric acid, or a solution of ferric or ferrous chlorid is applied to an oxidized ore, the copper is dissolved as the cupric or cuprous chlorid:

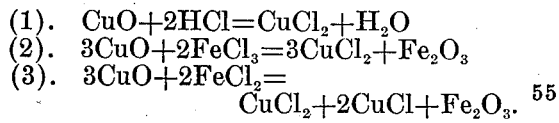

With sulfuric acid or ferric sulfate;

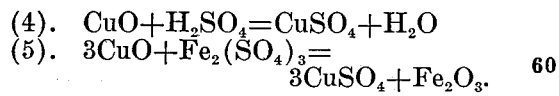

Whatever the solvent may be, the copper solution is filtered from the gangue and treated with hydrogen sulfid. The chlorid is precipitated thus:

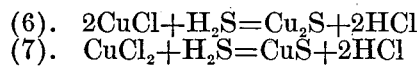

and the sulfate thus;

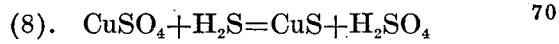

In either case the acid combined with the copper is regenerated and the copper precipitated as the sulfid, principally as CuS. The regenerated acid solution, filtered from the precipitate, is returned to the ore and the cycle repeated.

The precipitate, CuS, filtered from the regenerated but impure solution, is washed and electrolyzed. It will not usually be melted before electrolysis, and in no case is it necessary or desirable to first convert it into blister copper before subjecting it to electrolysis. The copper, preferably as the sulfid, is electrolyzed with dilute sulfuric acid as the electrolyte. It is evident, that the lixiviant and the electrolyte are entirely distinct from one another, and that in the chemical precipitation of the copper all the impurities, injurious to the electrolysis, were eliminated from the precipitate. From an acid solution only the metals of the first and second groups are affected by hydrogen sulfid, but these are rarely present in injurious amounts, and if present, whatever their effect may be on the ultimate copper product, they are negligible in so far as the efficiency of the electrolysis is concerned. Should the electrolyte ultimately become sufficiently impure in such metals as arsenic, antimony, and bismuth, these may be removed at intervals with hydrogen sulfid and the electrolysis again proceed with a pure solution. It will be observed particularly, that iron, which is the most injurious element so far as electrolysis is concerned, is entirely eliminated as an essential factor in the operation. Iron is not precipitated with hydrogen sulfid from an acid solution, in precipitating the copper. Nor is it found in the copper sulfid precipitate. The precipitate, which is practically pure copper sulfid, is very different under the action of electrolysis, from copper matte. Frequent attempts have been made to electrolyze copper matte, which is a copper iron sulfid, but the results have not met with the encouragement that was hoped for. In the electrolysis of pure copper sulfid, the most disturbing element—the iron—has been eliminated as a factor in the problem.

The copper sulfid may be electrolyzed by anodic or cathodic reduction. If anodic, then copper will be deposited at the cathode and sulfur liberated at the anode; if cathodic, copper will be deposited at the cathode and hydrogen sulfid and hydrogen liberated at the anode. In either case, the sulfur may be reconverted into hydrogen sulfid to precipitate more copper, or indirectly into acid to dissolve more copper.

If the sulfid precipitate is first roasted to convert the copper into sulfate, and the sulfate electrolyzed, then copper will be deposited at the cathode and acid regenerated at the anode, which may again be applied to the ore. The sulfur dioxid, liberated during the roasting, may be converted into hydrogen sulfid. Whatever the origin of the sulfur, it is preferably converted into hydrogen sulfid by passing it through incandescent carbonaceous material by suction working from below.

Having now, in a general way, outlined the process, I will describe it more specifically by referring to the accompanying drawing, in which—

1 is a tank for treating the ore preferably with an acid chlorid or sulfate solution. 2 is a precipitating and regenerating tower in which the precipitate, hydrogen sulfid, is brought in intimate contact with the lixiviant, and the copper is precipitated as the sulfid. The lixiviant and the precipitate together flow into tank 4, where the precipitate settles to the bottom. The clear supernatant regenerated acid solution, is decanted through the filter press 6, and returned to the ore. From time to time the accumulated sulfid precipitate is drained out of the tank into the press and washed with water. It is then removed and preferably, by high pressure, compressed into electrodes. By compressing the copper precipitate into electrodes, the process is facilitated, and pure electrolytic copper may be obtained from the precipitate without igneous refining into blister copper. The precipitate anodes are then placed in an electrolyzer 18, containing dilute sulfuric acid as the electrolyte.

19 represents the precipitate after being placed in the electrolyzer. The anodes are preferably placed horizontally, with spaces between them. The bottom of the electrolyzer constitutes a hopper for the accumulation of released sulfur. Suspended within the electrolyte and electrolyte tank is an electrode bell 20, containing the cathode 21, and having a diaphragm 26 stretched over its under side. The diaphragm is supported by mullions to which may be attached brushes for removing the sulfur from the face of the anodes, if necessary. The anode bell is oscillated by the mechanism 22.

If the precipitate is electrolyzed as the cathode instead of the anode, then hydrogen sulfid and hydrogen will be released, and this is withdrawn through the flexible pipe 23, and by means of the exhauster 15, forced into the precipitating and regenerating tower 2, to precipitate more copper and regenerate more acid. It is preferred, however, to electrolyze the precipitate as anode. When the precipitate is placed in the electrolyzer, resting on the conducting bars connecting with the dynamo 25, and the bell started to oscillate, the current is turned on. The copper sulfid is decomposed, copper being deposited on the cathode 21, and sulfur liberated on the face of the anodes 19. The oscillating movement of the bell, tends to make a firm coherent deposit of copper on the cathode, and to wash the liberated sulfur from the face of the anodes into the hopper of the electrolyzer, thus avoiding any undue resistance due to an accumulated layer of sulfur, which has proved so serious in the electrolysis of copper matte. The oscillating movement of the bell also agitates the electrolyte and greatly facilitates the solution of the copper and its reguline deposition. When the cathodes have been built up sufficiently,—say from one to one and one half inches, they may be removed, stripped of the deposited copper, and replaced. When the sulfur in the hopper of the electrolyzer has accumulated sufficiently, the valve 24 is opened, and it is washed out and filtered from the electrolyte. The electrolyte is returned to the electrolyzer, and the sulfur may be recovered, as such, or it may be used for the generation of sulfur dioxid to be converted into hydrogen sulfid, by means of the burner 10, and the converter 11. The object of the diaphragm is mostly to act as a filter in preventing any impurities, in suspension, from getting to the cathode. In this way the sulfur as washed from the anodes by the oscillating bell is prevented from getting to the cathodes and thus contaminating the copper. The diaphragm may be such as to offer practically no electrical resistance.

The sulfur as obtained by electrolyzing the copper sulfid may be burned to sulfur dioxid in the burner 10. Any other source of sulfur, such as sulfid ores, may be used for the same purpose. Whatever the source of the sulfur, it is converted into sulfur dioxid by oxidation in the burner 10, from which the sulfur fumes are led through the pipe 17, and together with steam entering through pipe 12, and a regulated amount of air entering through pipe 13, is introduced into the hydrogen sulfid converter 11. This converter consists of a pot or pan, having a grate near the bottom. The bottom space connects with an exhauster 15. The converter is filled with incandescent fuel, such as coal, charcoal, or coke, and the exhauster 15 sucks the sulfur dioxid and steam through the bed of incandescent carbon, whereby the sulfur dioxid is converted into hydrogen sulfid, and forced into the precipitating and regenerating tower 2, to pass through another cycle. When the incandescent carbon becomes cooled it is revivified by shutting off the steam and sulfur dioxid, and allowing only air to enter the converter. It will now be evident that the sulfur used in the process, may be used indefinitely. If the ore to be treated is a sulfid, this is of little consequence, for in such cases it would be better to market the elemental sulfur and use the sulfur dioxid from roasting the ore. In cases however, where oxidized ores are treated and sulfur is expensive, the cyclic use of the sulfur is of considerable economic importance. It will be further evident that no matter how foul the lixiviant may become, the electrolyte is always reasonably pure, and such small amounts of impurities as may be found in the electrolyte do not interfere with the electrolysis or with the purity of the deposited copper. In this way, by using only wet methods, the copper may be extracted direct from the ore and converted direct into electrolytic copper.

If the ore contains gold or silver worth recovering, the process is readily modified to extract these metals. If a sulfate solution is used to extract the copper, it will usually be found best to extract the precious metals with cyanid. If a chlorid solution is used for the copper, the silver will be largely extracted with the copper and the gold may be extracted by charging the solution with chlorin, generated say, in the electrolyzer 27, and introduced into the tower through the pipe 28. The solution, now charged with chlorin, is returned to the ore, and the gold extracted. If desired the copper solution may at once be charged with chlorin, in which case the copper, gold, and silver will be simultaneously extracted, and all precipitated with the hydrogen sulfid. After electrolysis of the precipitate, the precious metals may be recovered from the sulfur residue after burning or refining.

If it is desired to raise the valency of the salts in the lixiviant, as the ferrous chlorid to the ferric chlorid, the chlorin from the electrolyzer 27 may be used for that purpose; or if it is desired to convert the ferrous sulfid to the ferric sulfate before applying the lixiviant to the ore, then the electrolyzer 27 may be used as an ozonizer and the ozone and air brought into intimate contact with the lixiviant in tower 2. The raising of the valency of the salts in the lixiviant, would of course be done after the precipitation, by again passing it through the same tower or one similar to it. The raising of the valency of the iron salts will frequently be desirable before applying the lixiviant to the ore, since ferric sulfate is a good solvent of copper, and ferric chlorid is a good solvent of both copper and silver. The regenerated acid solution is returned to the ore by means of the pump 8, and the pipe line 9.

If it is not desired to electrolyze the sulfid, the sulfid precipitate may be first oxidized in a muffle furnace to the sulfate, in which case copper will be deposited at the cathode and sulfuric acid generated at the anode, and this acid may then be applied to the ore; if sulfur dioxid is liberated during roasting it may be converted into hydrogen sulfid as already described.

In the generation of the hydrogen sulfid, it is evident that instead of the sulfur gas being conducted through a bed of incandescent carbon the same results may be obtained by the suction of hydrocarbon gases through a bed of burning pyrites, in the converter 11. The arrangement of the converting apparatus is such that the conversion of the sulfur into hydrogen sulfid is effectively carried out. The suction downward is better regulated and the issuing gas more uniform.

The process is capable of various modifications, but these modifications will be readily understood from the complete description of the preferred method in its application to copper.

So far as at present known, no method has yet been devised which produces electrolytic copper direct from a chemical precipitate, without first passing through the stage of refining to blister copper. It is claimed for this process that no fusion refining is necessary, and that step is entirely avoided.

If there is an excess of hydrogen sulfid in the lixiviant, after precipitation, if the lixiviant is a chlorid solution the excess of hydrogen sulfid is readily converted into acid by chlorin, (9). $H_2S + 2Cl = 2HCl + S$, before applying the solvent to the ore. If the application of the chlorin is continued, the ferrous salts will be converted into the ferric salts, which will usually be desirable.

Having thus described my invention, what I claim is:

1. A process which consists in dissolving copper from its ores with an acid solvent; applying hydrogen sulfid to the resulting copper solution to precipitate the copper and regenerate acid; separating the regenerated acid solution from the sulfid precipitate and returning it to the ore to dissolve more copper; treating the sulfid precipitate to recover the copper and elemental sulfur; treating the elemental sulfur to convert it into a precipitant, and then applying the precipitant so produced to precipitate the copper dissolved by the regenerated acid solution.

2. A process which consists in dissolving copper from its ores with an acid solvent; applying hydrogen sulfid to the resulting copper solution to precipitate the copper and regenerate acid; separating the regenerated acid solution from the sulfid precipitate and returning it to the ore to dissolve more copper; subjecting the precipitate to the action of the electric current to separate the metal from the sulfur; then treating the sulfur to convert it into hydrogen sulfid, and then applying the hydrogen sulfid so produced to precipitate the copper dissolved by the regenerated acid solution, and thus using cyclically both the acid as the solvent and the sulfur as the precipitant.

3. A process which consists in dissolving copper from its ores with an acid solvent; applying hydrogen sulfid to the resulting copper solution to precipitate the copper and regenerate acid; separating the regenerated acid solution from the sulfid precipitate and returning it to the ore to dissolve more copper; and then subjecting the sulfid precipitate to the action of the electric current to recover metallic copper and elemental sulfur.

4. A process of extracting copper from its ores which consists in treating the ore with a dilute acid solution to extract the copper; separating the solution from the gangue; precipitating the copper as sulfid with hydrogen sulfid; separating the lixiviant from the sulfid precipitate; raising the valency of the bivalent salts in the lixiviant and then again applying it to the ore; and electrolyzing the copper precipitate in an electrolyte separate and distinct from the lixiviant to recover the copper in its metallic condition.

5. A process of extracting copper from its ores containing precious metals which consists in treating the ore with an acid chlorid solution to dissolve the copper; separating the dissolved copper from the gangue; precipitating the copper as sulfid with hydrogen sulfid with the simultaneous regeneration of hydrochloric acid; separating the regenerated acid lixiviant from the sulfid precipitate; applying chlorin to the lixiviant; returning the regenerated chlorin chlorid solution to the ore to dissolve the precious metals, and electrolyzing the precipitate of copper and precious metals, in a sulfate electrolyte, to recover separately the copper and precious metals.

6. A process which consists in dissolving copper from its ores with an acid solvent; applying hydrogen sulfid to the resulting copper solution to precipitate the copper and regenerate acid; separating the regenerated acid solution from the sulfid precipitate and returning it to the ore to dissolve more copper; subjecting the sulfid precipitate to the action of electrolysis to recover metallic copper and liberate elemental sulfur, and removing the elemental sulfur so liberated during electrolysis from the sphere of action of the electric current.

WILLIAM E. GREENAWALT.

Witnesses:
JOSEPH S. HEALEY,
JESSIE G. SILLERS.